United States Patent
Uoya et al.

(10) Patent No.: US 11,168,992 B2
(45) Date of Patent: Nov. 9, 2021

(54) TRAVEL ROUTE GENERATION DEVICE AND METHOD FOR GENERATING TRAVEL ROUTE FOR FIELD WORK VEHICLE

(71) Applicant: Kubota Corporation, Osaka (JP)

(72) Inventors: Yasuhisa Uoya, Amagasaki (JP); Izuru Shimamoto, Amagasaki (JP); Kenji Tamatani, Amagasaki (JP); Megumi Suzukawa, Amagasaki (JP); Atsushi Shinkai, Sakai (JP); Kazuo Sakaguchi, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 52 days.

(21) Appl. No.: 15/841,294

(22) Filed: Dec. 14, 2017

(65) Prior Publication Data

US 2018/0209799 A1 Jul. 26, 2018

(30) Foreign Application Priority Data

Jan. 20, 2017 (JP) .............................. JP2017-008338

(51) Int. Cl.
*A01D 34/00* (2006.01)
*G05D 1/02* (2020.01)
(Continued)

(52) U.S. Cl.
CPC ............ *G01C 21/34* (2013.01); *A01B 69/008* (2013.01); *A01B 79/005* (2013.01);
(Continued)

(58) Field of Classification Search
None
See application file for complete search history.

(56) References Cited

U.S. PATENT DOCUMENTS

| 8,954,216 B2 * | 2/2015 | Yazaki ................. A01D 34/008 701/24 |
| 2005/0075785 A1 * | 4/2005 | Gray .................... G05D 1/0274 701/410 |

(Continued)

FOREIGN PATENT DOCUMENTS

| EP | 3104245 | 12/2016 |
| JP | 10-66405 | 3/1998 |

(Continued)

OTHER PUBLICATIONS

Extended European Search Report for corresponding EP Application No. 17001991.3-1006, dated Jun. 14, 2018.

(Continued)

*Primary Examiner* — Adam D Tissot
*Assistant Examiner* — Laura E Linhardt
(74) *Attorney, Agent, or Firm* — Mori & Ward, LLP

(57) ABSTRACT

A travel route generation device for a field work vehicle includes a memory and circuitry. The circuitry is configured to generate, based on field data stored in the memory, a travel route. The circuitry is configured to determine a getting-off point in the travel route at which a driver gets off the field work vehicle. The circuitry is configured to determine a getting-on point in the travel route at which the driver gets on the field work vehicle. The circuitry is configured to define a first partial route in the travel route between the entrance and the getting-off point and a second partial travel route in the travel route between the getting-on point and the entrance as a manual travel route. The circuitry is configured to define a third partial travel route in the travel route between the getting-off point and the getting-on point as an automatic travel route.

19 Claims, 4 Drawing Sheets

(51) Int. Cl.
  *G01C 21/34*  (2006.01)
  *A01C 1/00*   (2006.01)
  *A01B 76/00*  (2006.01)
  *A01B 69/04*  (2006.01)
  *A01B 79/00*  (2006.01)
  *G01C 21/00*  (2006.01)

(52) U.S. Cl.
  CPC ......... *G01C 21/005* (2013.01); *G05D 1/0212* (2013.01); *G05D 1/0219* (2013.01); *G05D 1/0274* (2013.01); *G05D 1/0278* (2013.01); *G05D 2201/0201* (2013.01)

(56) References Cited

U.S. PATENT DOCUMENTS

| | | | | |
|---|---|---|---|---|
| 2011/0167574 | A1* | 7/2011 | Stout | G05D 1/0219 15/3 |
| 2017/0090479 | A1* | 3/2017 | Wilcox | G05D 1/0219 |
| 2017/0168501 | A1* | 6/2017 | Ogura | G05D 1/0038 |
| 2017/0300064 | A1* | 10/2017 | Wolters | G05D 1/0217 |
| 2019/0239416 | A1* | 8/2019 | Green | A01B 69/008 |

FOREIGN PATENT DOCUMENTS

| | | |
|---|---|---|
| JP | 11-075426 | 3/1999 |
| JP | 2004-8053 | 1/2004 |
| JP | 2015-112071 | 6/2015 |

OTHER PUBLICATIONS

Japanese Office Action for corresponding JP Application No. 2017-008338, dated May 21, 2020 (w/ machine translation).
Japanese Office Action for corresponding JP Application No. 2017-008338, dated Nov. 20, 2020 (w/ machine translation).

* cited by examiner

TRAVEL ROUTE GENERATION DEVICE AND METHOD FOR GENERATING TRAVEL ROUTE FOR FIELD WORK VEHICLE

CROSS-REFERENCE TO RELATED APPLICATIONS

The present application claims priority under 35 U.S.C. § 119 to Japanese Patent Application No. 2017-008338, filed Jan. 20, 2017. The contents of this application are incorporated herein by reference in its entirety.

BACKGROUND OF THE INVENTION

Field of the Invention

The present invention relates to a travel route generation device and a method for generating a travel route for a field work vehicle.

Discussion of the Background

It has been proposed that tilling work with a tractor and harvesting work with a combine are performed by automatic traveling. A shape of a field varies, and it is necessary to generate a travel route associated with a shape of the field in order to perform the automatic traveling.

Japanese Patent Application Laid-open No. 10-66405 discloses a tractor that performs the tilling work in the field by the automatic traveling. The tilling work performed here includes turning work in which the work vehicle turns around a field peripheral area, and reciprocating straight work in which the work vehicle repeatedly performs straight work in a central area of the field (an inside area of the field peripheral area) while performing 180°-turning in the field peripheral area (also called a headland). At that time, the number of returning strokes from a start point to an end point of the reciprocating straight work and the number of turns from the start point to the end point of the turning work are determined based on a work condition including specifications of the work vehicle. It has also been proposed that the reciprocating straight work is previously performed and then the turning work is performed and that the start point of the turning work is set near a corner nearest to an entrance of the field.

The field work vehicle of Japanese Patent Application Laid-open No. 2015-112071 includes a route calculation unit that calculates a travel route for the automatic traveling with topographic data of the field read from a field information storage as a basic condition. The route calculation unit obtains the shape of the field from the topographical data and calculates the travel route from the set traveling start point to the traveling end point. At that time, frequently a place for entering and leaving the field from the ridge or the farm road is determined in the field. Therefore, in the Japanese Patent Application Laid-open No. 2015-112071, the traveling start point is defined by the entrance position of the field, and the traveling end point is defined by the exit position of the field. When the travel route is calculated by the route calculation unit, a position of an own vehicle is obtained based on the positioning data (latitude and longitude data) obtained from a global positioning system (GPS) module, and a driving support unit supports the driving of the field work vehicle such that a traveling vehicle travels accurately on the travel route.

SUMMARY OF THE INVENTION

According to one aspect of the present invention, a travel route generation device for a field work vehicle, includes a memory and circuitry. The memory is to store field data including a shape of a field and a position of an entrance to the field. The circuitry is configured to generate, based on the filed data, a travel route in the field along which the field work vehicle is configured to travel. The circuitry is configured to determine a getting-off point in the travel route at which a driver gets off the field work vehicle. The circuitry is configured to determine a getting-on point in the travel route at which the driver gets on the field work vehicle. The circuitry is configured to define a first partial route in the travel route between the entrance and the getting-off point and a second partial travel route in the travel route between the getting-on point and the entrance as a manual travel route. The circuitry is configured to define a third partial travel route in the travel route between the getting-off point and the getting-on point as an automatic travel route.

According to another aspect of the present invention, a travel route generation device for a field work vehicle includes memory means, generating means, getting-off point determining means, getting-on point determining means, manual travel route defining means, and automatic travel route defining means. The memory means are for storing field data including a shape of a field and a position of an entrance to the field. The generating means are for generating, based on the filed data, a travel route in the field along which the field work vehicle is configured to travel. The getting-off point determining means are for determining a getting-off point in the travel route at which a driver gets off the field work vehicle. The getting-on point determining means are for determining a getting-on point in the travel route at which the driver gets on the field work vehicle. The manual travel route defining means are for defining a first partial route in the travel route between the entrance and the getting-off point and a second partial travel route in the travel route between the getting-on point and the entrance as a manual travel route. The automatic travel route defining means for defining a third partial travel route in the travel route between the getting-off point and the getting-on point as an automatic travel route.

According to a further aspect of the present invention, a method for generating a travel route for a field work vehicle includes storing field data including a shape of a field and a position of an entrance to the field. The method includes generating, based on the filed data, the travel route in the field along which the field work vehicle is configured to travel, determining a getting-off point in the travel route at which a driver gets off the field work vehicle, and determining a getting-on point in the travel route at which the driver gets on the field work vehicle. A first partial route in the travel route between the entrance and the getting-off point and a second partial travel route in the travel route between the getting-on point and the entrance as a manual travel route are defined. A third partial travel route in the travel route between the getting-off point and the getting-on point as an automatic travel route is defined.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
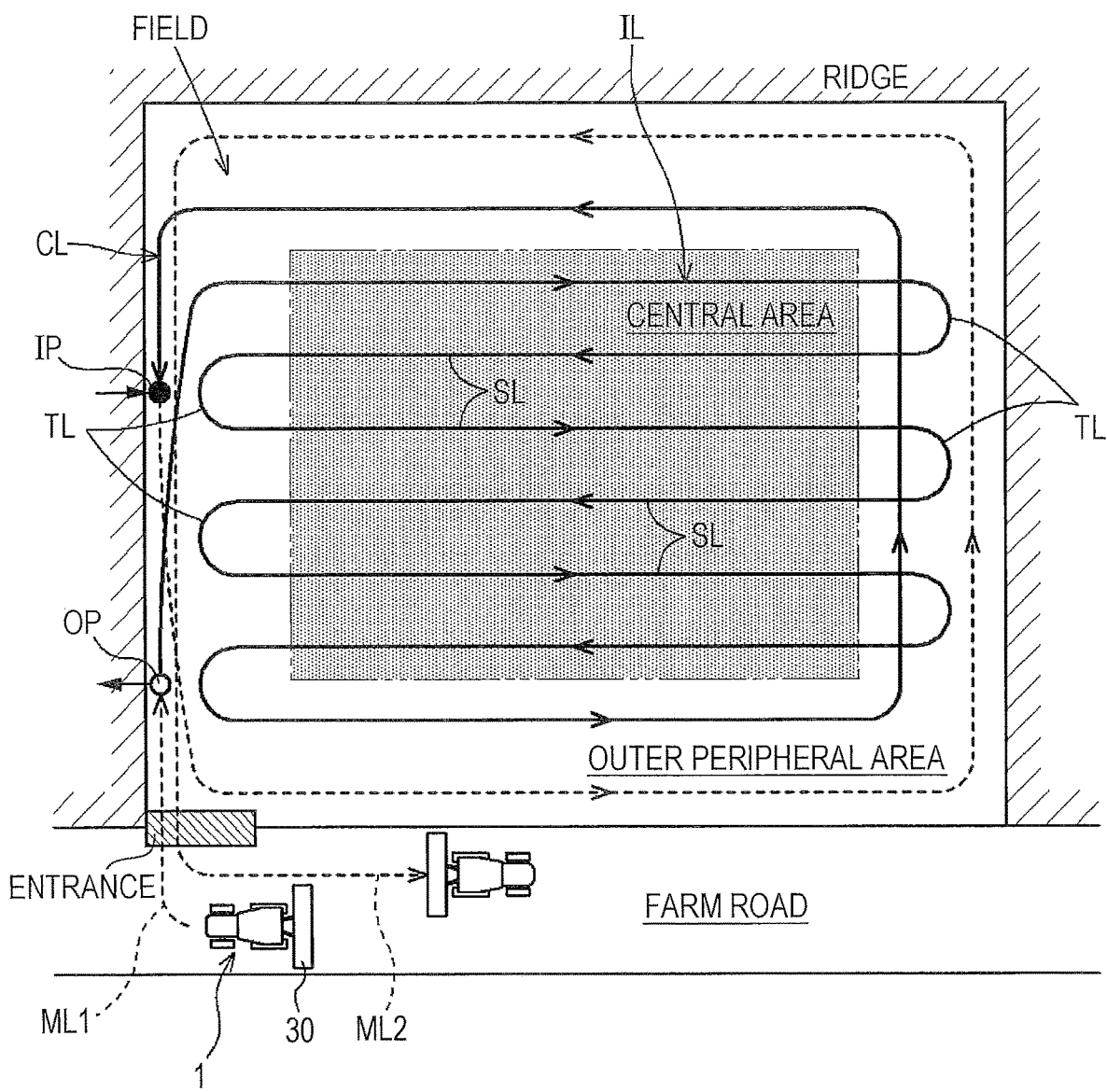
FIG. 1 is a schematic diagram illustrating a travel route indicating a position at which a driver gets on and off a field work vehicle in a field during switching between automatic traveling and manual traveling, and movement of the field work vehicle along the travel route.

The embodiments will now be described with reference to the accompanying drawings, wherein like reference numerals designate corresponding or identical elements throughout the various drawings.

A travel route generation device according to an exemplary embodiment of the present invention will be described with reference to the drawings. In the exemplary embodiment, a field work vehicle is a tractor equipped with a work device 30 on a vehicle body 1, and works and travels along a travel route in a field. FIG. 1 illustrates an example of a travel route in which the tractor that stops outside an entrance of the field enters the field through the entrance by manual traveling, switches to automatic traveling, works and travels in most of the field, and finally switches to the manual traveling again, manually travels a corner area that is difficult to work by the automatic traveling, and goes out the field through the entrance. In the example of FIG. 1, in the manual operation, the tractor passes through the entrance from a farm road, and stops at a getting-off point (indicated by OP in FIG. 1) set on a ridge near the entrance, and a driver gets off the tractor. Generally, the field is lowered from the surrounding farm road and the surrounding ridge, the traveling surface of the entrance is inclined, and a width of the entrance is narrow. From the getting-off point, the tractor is switched to the automatic traveling, and starts the work traveling along the set travel route. A getting-on point (indicated by IP in FIG. 1) is set at a position of the travel route in which only the area adjacent to the outermost ridge is left, the tractor stops at the getting-on point, and is switched from the automatic traveling to the manual traveling. Because the getting-on point is set at the ridge, the driver gets on the tractor from the ridge. In the area adjacent to the outermost ridge, the tractor works by the manual traveling, and finally enters the farm road through the entrance. In the area adjacent to the outermost ridge, the tractor may also work by the automatic traveling, and travel only on the route passing through the entrance by the manual traveling. However, the entrance of the field becomes a narrow slope and it is difficult to perform the automatic traveling, and thus the manual traveling is used.

The travel route in FIG. 1 is frequently used in field work. The travel route is substantially constructed with an inside travel route including straight routes and a U-turn route connecting the straight routes, a round travel route going around an outer peripheral area of the filed, an entry route from the farm road to the field through the entrance, and an exit route from the field to the farm road through the entrance. That is, the field is divided into the outer peripheral area and a central area located inside the outer peripheral area, the inside travel route is set to the central area, and the round travel route is set to the outer peripheral area. The outer peripheral area is an area where a space required for the U-turn route is secured, and a width of the outer peripheral area is determined based on a work width of the work vehicle and a minimum turning radius. A distance between the straight routes in the inside travel route is the work width of the work vehicle, in particular, the work width in consideration of overlapping. In FIG. 1, the straight route is designated by the symbol SL, the U-turn route is designated by the symbol TL, the inside travel route is designated by the symbol IL, the round travel route is designated by the symbol CL, the entry route is designated by the symbol ML1, and the exit route is designated by the symbol ML2. The inside travel route including the straight route and the U-turn route is a travel route suitable for the automatic traveling. In the actual field, the inside travel route is most of the travel route covering the field.

Figure 2:
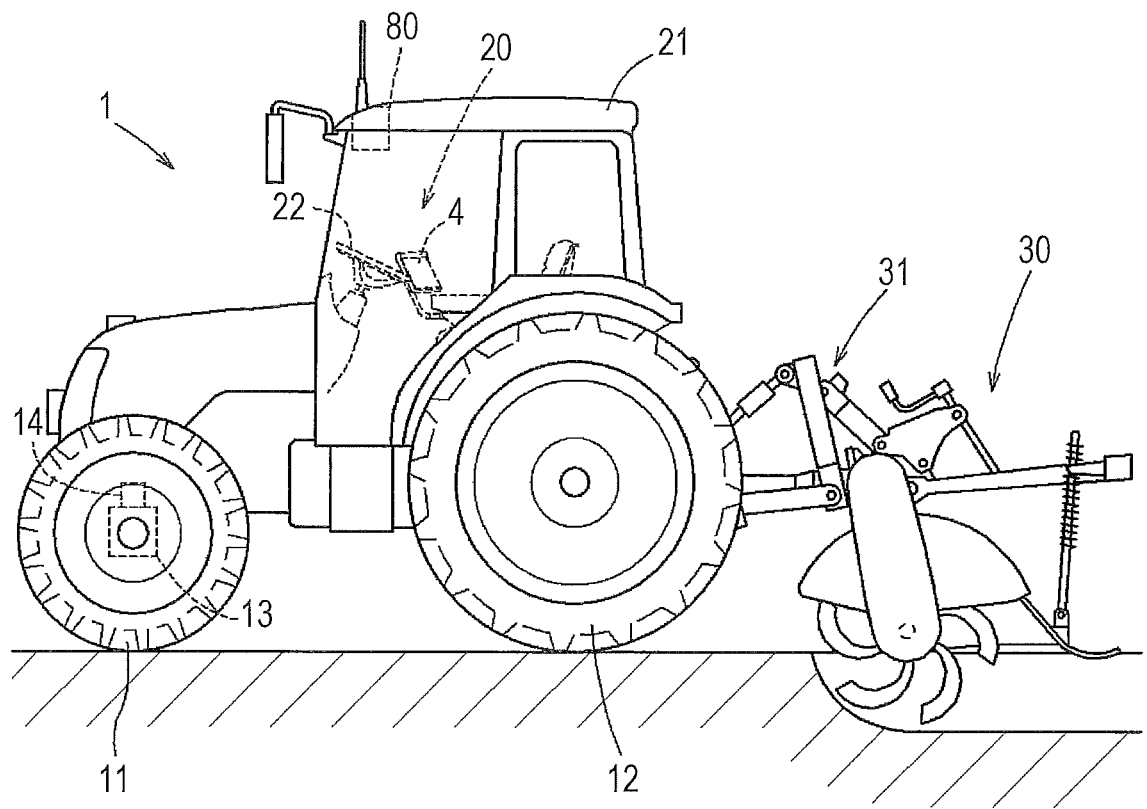
FIG. 2 is a side view illustrating a tractor that is an example of the field work vehicle.

As illustrated in FIG. 2, the tractor is provided with a driver's cab 20 in a central portion of the vehicle body 1 supported by front wheels 11 and rear wheels 12. At a rear of the vehicle body 1, the work device 30 that is a rotary tilling device is mounted with a hydraulic lifting mechanism 31 interposed therebetween. The front wheels 11 function as a steering control wheel, and the tractor changes a traveling direction when a steering angle of the steering control wheel is changed. The steering angle of the front wheel 11 is changed by operation of a steering mechanism 13. The steering mechanism 13 includes a steering motor 14 for automatic steering. For the manual traveling, the front wheels 11 are steered by operating a steering wheel 22 disposed on the driver's cab 20. The driver's cab 20 is equipped with a general-purpose terminal 4 that receives a command from a user and provides information to the user. A cabin 21 of the tractor is provided with a satellite positioning module 80. A satellite antenna for receiving a global navigation satellite system (GNSS) signal (including a GPS signal) is attached at a ceiling area of the cabin 21 as a component of the satellite positioning module 80. The satellite positioning module 80 may include an inertial navigation module incorporated with a gyro acceleration sensor and a magnetic azimuth sensor in order to supplement satellite navigation. The inertial navigation module may also be provided in a location different from that of the satellite positioning module 80.

Figure 3:
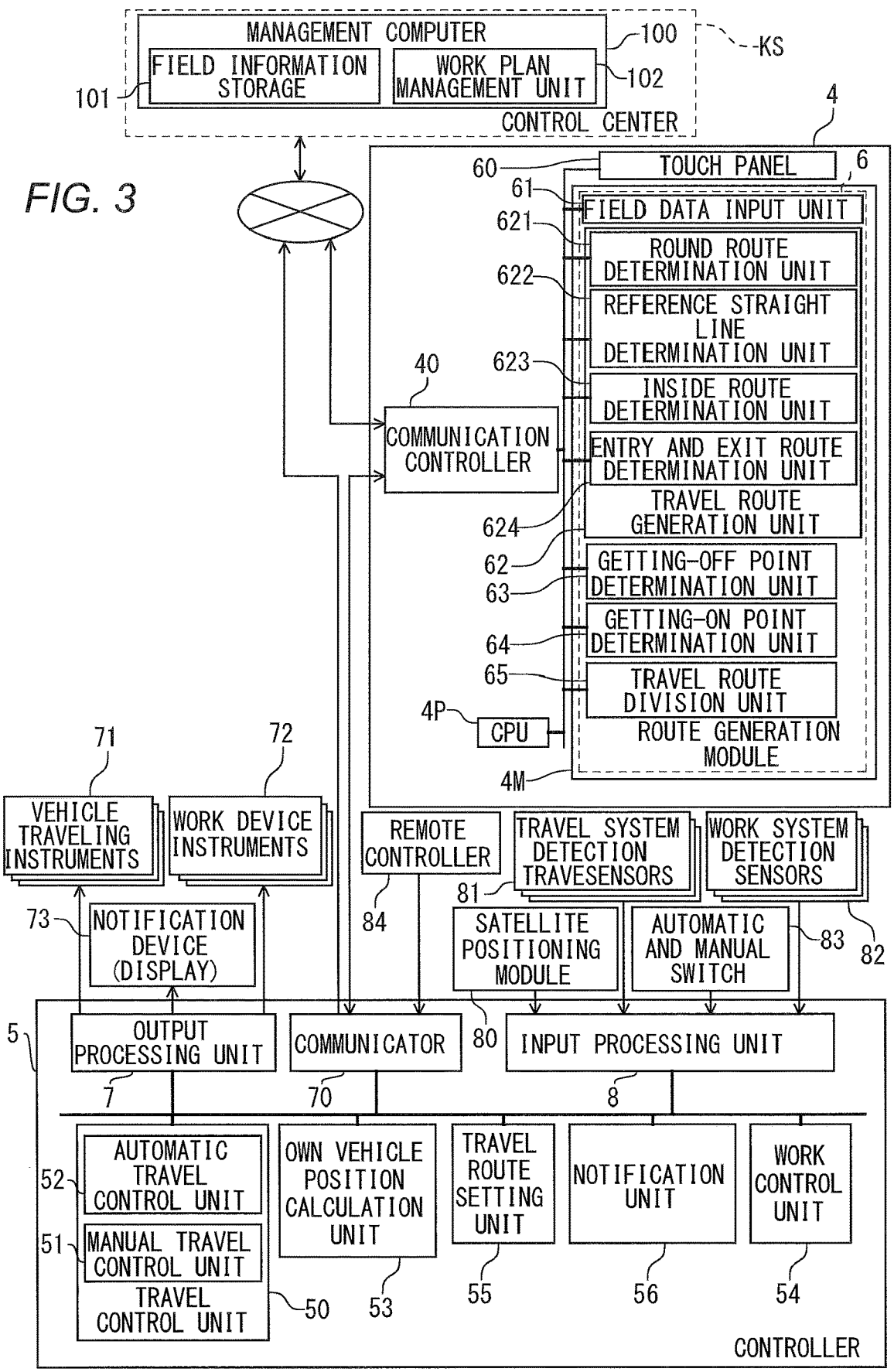
FIG. 3 shows a structure of a control unit (a travel route generation device).

FIG. 3 illustrates a control system configured in the tractor. The control system of the exemplary embodiment includes a first controlling unit that is the general-purpose terminal 4 including a graphical user interface, a controller 5 that controls the vehicle body 1 of the tractor and the work device 30, and a remote controller 84 that wirelessly controls traveling start and traveling end of the tractor from the outside. The travel route generation device of the embodiment is modularized as a route generation module 6, and incorporated in the general-purpose terminal 4.

In addition to the route generation module 6, the general-purpose terminal 4 includes a communication controller 40 and a touch panel 60 in a general computer system. The general-purpose terminal 4 is connected to the controller 5 such that data can be exchanged by an in-vehicle LAN, wireless communication, wired communication, or the like. Additionally, the general-purpose terminal 4 can exchange data with a management computer 100 constructed in a remote control center KS through a radio line or the Internet. When the general-purpose terminal 4 is constructed with a tablet computer, mobile phone, or the like and connected to a control system of the tractor such that data can be exchanged, the general-purpose terminal 4 can be used while brought out of the tractor.

In the exemplary embodiment, field information including a field position on a map and arrangement of farm roads surrounding the field is stored in a field information storage 101 of the management computer 100, and the field information is required to find the field to be worked. The management computer 100 also includes a work plan management unit 102 that manages a work plan describing contents of work in the designated field. The general-purpose terminal 4 can access the management computer 100, download the field information from the field information storage 101, and download the work plan from the work plan management unit 102. Alternatively, the general-purpose terminal 4 can input the field information and the work plan through a recording medium such as a USB memory.

The route generation module 6 generates the travel route. The route generation module 6 includes a field data input unit 61, a travel route generation unit 62, a getting-off point determination unit 63, a getting-on point determination unit 64, and a travel route division unit 65. In order to generate a basic travel route, the travel route generation unit 62 includes a round route determination unit 621, a reference straight line determination unit 622, an inside route determination unit 623, and an entry and exit route determination unit 624. A basic role of each unit of the route generation module 6 will be described with reference to a flow chart of travel route generation processing in FIG. 4. Specifically, the general-purpose terminal 4 includes a central processing unit (CPU) 4P (circuitry 4P) and a memory 4M. Programs and data of the route generation module 6 including the field data input unit 61, the travel route generation unit 62, the getting-off point determination unit 63, the getting-on point determination unit 64, and the travel route division unit 65 are stored in the memory 4M. The programs are executed by the CPU 4P to perform a function of the route generation module 6.

The field data input unit 61 inputs field shape data indicating a shape of the field to be worked and entrance position data indicating the position and shape of the entrance of the field, and develops the field shape data and the entrance position data in a working memory area. The round route determination unit 621 determines a round travel route for traveling around the outer peripheral area of the field. Based on the work width (precisely, the work width in consideration of an overlapping width) and the proper turning radius of the tractor, the distance necessary for the U-turn is calculated, and a round area in which the value of an integral multiple of the work width that can secure to the distance of the U-turn is set to the width is determined as the outer peripheral area allocated to the round travel route. When the outer peripheral area is determined, a number of turns of the round travel route is determined. In a general tilling work, an area corresponding to a 2-lap to 3-lap round travel route is set to the outer peripheral area. As illustrated in FIG. 1, the area inside the outer peripheral area constitutes the central area.

Figure 4:
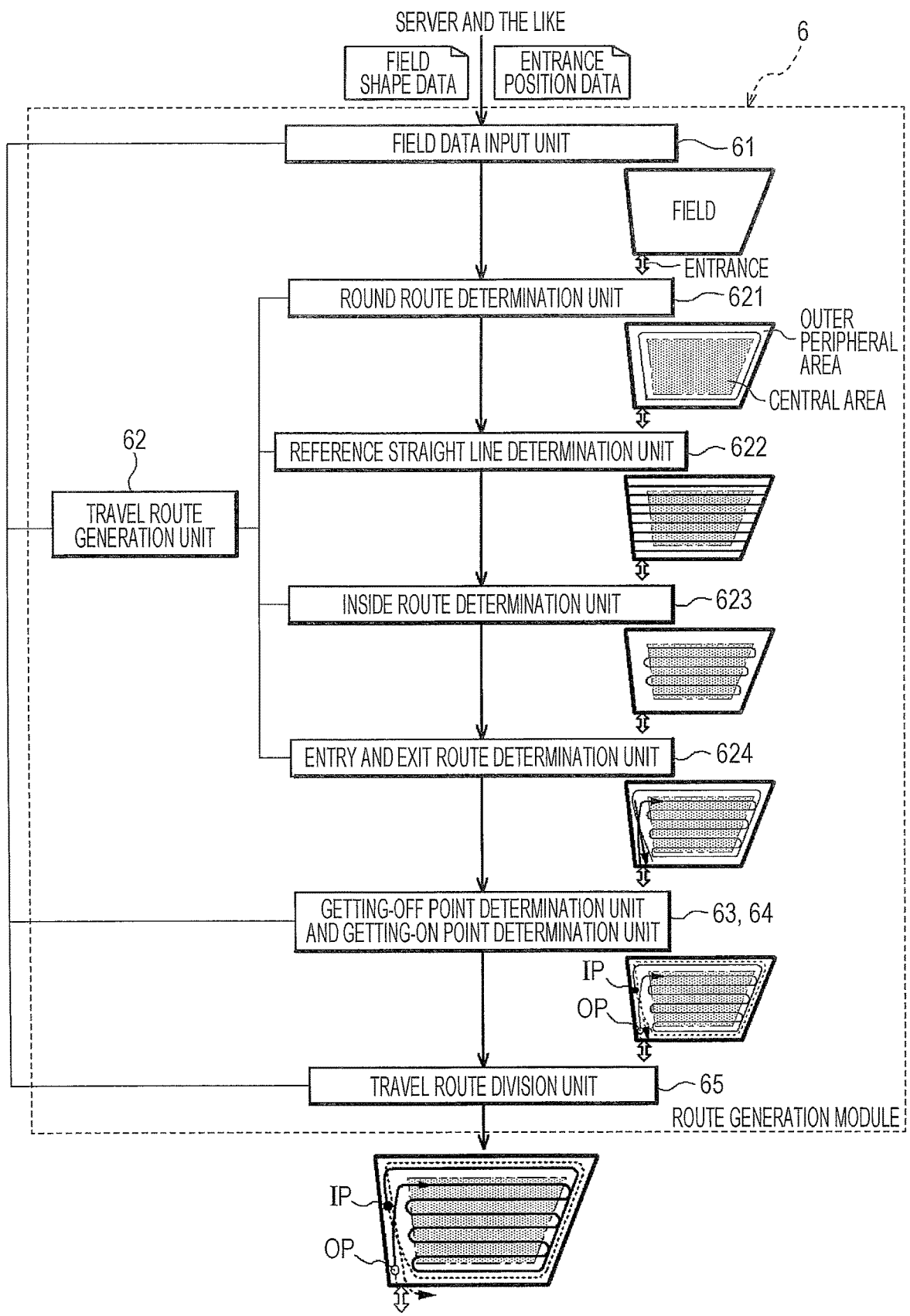
FIG. 4 is an explanatory diagram illustrating an example of a travel route generated by the travel route generation device.

The reference straight line determination unit 622 determines reference straight lines that extend in parallel with a reference side of the field and fill the central area at predetermined intervals. The reference straight lines are the base of the travel route in the central area. The determination of the reference straight lines is pre-processing of generating the inside travel route. At that time, generally a longest side of an approximate polygon generated by the shape of the field is adopted as the reference side of the field. In the example of FIG. 4, the longest side of a trapezoidal (quadrangular) shape is selected as the reference side, and the reference straight lines that fill the central area with the work width is set in parallel with the reference side. The inside route determination unit 623 sets the reference straight lines in the central area to the straight route, and connects each straight route with the U-turn route to generate the continuous inside travel route.

Then, the entry and exit route determination unit 624 determines the entry route, which enters from the farm road to the field through the entrance and connects with the inside travel route, and the exit route, which connects with the round travel route and exits to the farm road from the field through the entrance. For the tilling work, generally the tractor works and travels along the inside travel route, then works and travels along the round travel route, and exits directly from the field through the entrance. Accordingly, the entry route is determined so as to extend along a passing direction of the entrance to connect smoothly with an end point of the inside travel route, and the exit route is determined so as to extend along the passing direction of the entrance to connect smoothly with the round travel route. The travel route generation unit 62 sequentially connects the entry route, the inside travel route, the round travel route, and the exit route, which are determined in this way, thereby generating a basic travel route for the tractor to travel in the field.

In the basic travel route generated by the travel route generation unit 62, preferably in a route portion entering the outer peripheral area through the entrance of the entry route, the getting-off point determination unit 63 determines a position suitable for a predetermined getting-off point condition as the getting-off point. The driver who gets on the tractor at the farm road causes the tractor to entry the outer peripheral area along the entry route, stops the tractor at the getting-off point, switches from the manual operation to the automatic operation, and gets off the tractor. Then, the automatic operation is started using the remote controller 84.

In the basic travel route generated by the travel route generation unit 62, preferably in a route portion in the outer peripheral area separated from the entrance of the exit route, the getting-on point determination unit 64 determines a position suitable for a predetermined getting-on point condition as the getting-on point. The tractor stops at the getting-on position. The driver who gets on the stopped tractor manually drives the tractor along the exit route, passes through the entrance, and causes the tractor to travel to the farm road. In the example of FIG. 1, although the round travel route for one round is included in the exit route, a short exit route that passes only through the entrance may be selected.

Examples of the getting-off point condition and the getting-on point condition for determining the getting-off point and the getting-on point include proximity to the extension line of an entrance slope, proximity to the ridge in the vicinity of the entrance, and facing of a driver's exit of the field work vehicle to the ridge. Basically, the getting-off point condition and the getting-on point condition are set such that the driver walks easily from the field work vehicle to the ridge and from the ridge to the field work vehicle. The getting-off point condition and the getting-on point condition may be common, or the getting-off point and the getting-on point may be set to a common point.

The getting-off point determination unit 63 and the getting-on point determination unit 64 can also determine the getting-off point and the getting-on point based on the operation input by the user instead of automatically determining the getting-off point and the getting-on point according to a predetermined condition and an algorithm. The operation input by the user is achieved by designating the getting-off point and the getting-on point with respect to the entry route, the exit route, and the round travel route, which are displayed on the touch panel 60.

Additionally, the travel route division unit 65 defines a travel route portion between the getting-off point and the getting-on point on the travel route as the automatic travel route (travel route for automatic traveling), and defines a travel route portion between the entrance and the getting-off point in the travel route and a travel route portion between the getting-on point and the entrance as the manual travel route (travel route for manual traveling). That is, the travel route division unit 65 divides the basic travel route generated by the travel route generation unit 62 into the manual travel route and the automatic travel route based on the getting-off point and the getting-on point, generates the final travel route, and provides the final travel route to the controller 5.

As illustrated in FIG. 3, the controller 5 that is a core element of the tractor control system includes an output processing unit 7, an input processing unit 8, and a communicator 70, which are input and output interfaces. The output processing unit 7 is connected to vehicle traveling instruments 71, work device instruments 72, a notification device 73, which are incorporated in the tractor. The vehicle traveling instruments 71 include a steering motor 14 and devices (not illustrated), such as a transmission mechanism and an engine unit, which are controlled for the traveling of the vehicle. The work device instruments 72 include a drive mechanism for the work device 30 and a lifting mechanism 31 that raises and lowers the work device 30. The notification device 73 includes a display, a lamp, and a speaker. The notification device 73 is used to notify the driver or the supervisor of precaution information and warning information such as a travel precautions and a deviation from a target travel route when the work vehicle is automatically steered. The communicator 70 is configured to send data processed by the controller 5 to the management computer 100, and to receive various kinds of data from the management computer 100. Additionally, the communicator 70 inputs a remote control command from the remote controller 84.

The input processing unit 8 is connected to a satellite positioning module 80, travel system detection sensors 81, work system detection sensors 82, and an automatic and manual switch 83. The travel system detection sensors 81 include a sensor that detects a traveling state such as an engine speed and a transmission state. The work system detection sensors 82 include a sensor that detects a position and an inclination of the work device 30 and a sensor that detects workloads. The automatic and manual switch 83 is a switch that selects either an automatic travel mode for traveling with automatic steering or a manual travel mode for traveling with manual steering.

The controller 5 also includes a travel control unit 50, a work control unit 54, an own vehicle position calculation unit 53, a travel route setting unit 55, and a notification unit 56. The own vehicle position calculation unit 53 calculates an own position based on the positioning data sent from the satellite positioning module 80. Since the tractor is configured so as to be able to travel in both the automatic travel (automatic steering) mode and the manual travel (manual steering) mode, the travel control unit 50 that controls the vehicle traveling instruments 71 includes a manual travel control unit 51 and an automatic travel control unit 52. The manual travel control unit 51 controls the vehicle traveling instruments 71 based on the operation performed by the driver. The automatic travel control unit 52 calculates an azimuth deviation and a positional deviation between the travel route set by the travel route setting unit 55 and the own vehicle position, and generates an automatic steering command. The automatic steering command is output to the steering motor 14 through the output processing unit 7. The automatic travel control unit 52 stops the tractor based on a stop command from the remote controller 84 and starts the traveling of the tractor based on a start command from the remote controller 84. In order to control the movement of the work device 30, the work control unit 54 provides a control signal to the work device instruments 72. The notification unit 56 generates a notification signal (display data and voice data) notifying a driver and a supervisor of necessary information, and provides the notification signal to the notification device 73 incorporated in an instrument panel.

The travel route setting unit 55 receives the manual travel route (the travel route for the manual traveling) and the automatic travel route (the travel route for the automatic traveling) generated by the route generation module 6 from the general-purpose terminal 4 through the communicator 70, and sets the manual travel route and the automatic travel route to the target travel route of the tractor.

Other Exemplary Embodiments (1) The travel route on which the single field work vehicle works and travels in the field is generated in the above exemplary embodiment. A recently-proposed cooperative traveling control system in which work traveling is performed in a field using a plurality of field work vehicles capable of automatic traveling includes a master work vehicle that travels manually by a driver and at least one slave work vehicle that travels automatically without a person under the control of the master work vehicle. Before the work traveling is actually performed, in accordance with the manual traveling performed by the driver who gets on the slave work vehicle outside the field, the slave work vehicle passes through the entrance and moves to a proper position in the field. Then, the driver gets off the slave work vehicle and transfers to the master work vehicle. The slave work vehicle is unmanned and performs the automatic traveling in cooperation with the manned master work vehicle. The slave work vehicle stops at a proper position after the completion of the work traveling. The driver again gets on the slave work vehicle that is stopping, passes through the entrance in the manual traveling, and leaves the field. During the switching between the manual traveling and the automatic traveling in the slave work vehicle, the driver can smoothly get on and off the slave work vehicle through the travel route generated by the travel route generation device of the present embodiment, and a burden on the driver is reduced. That is, the travel route generation device of the present embodiment can be favorably applied to a slave work vehicle in the cooperative traveling control system.

(2) Each unit in the block diagram of FIG. 3 is mainly separated for description purposes. Actually, each unit can be integrated with another unit, or divided into a plurality of sub units. For example, the route generation module 6 is constructed in the management computer 100, and the travel route generated by the management computer 100 may be downloaded to the controller 5 of the work vehicle. Alternatively, the route generation module 6 may be constructed in the controller 5 of the work vehicle.

(3) In the above exemplary embodiment, the longest side of the field indicated by the polygon is set to the reference side. Alternatively, a side designated by the user in the field indicated by the polygon may be set to the reference side. Alternatively, a virtual side (for example, an opposing side of a polygon or a side connecting adjacent sides) based on a side of a polygon can be used as a reference side.

(4) In the above exemplary embodiment, the travel route on which the work vehicle performs the work traveling is substantially constructed with the inside travel route including the straight routes and the U-turn route connecting the straight routes and the round travel route for traveling around the outer peripheral area of the field. Alternatively, a spiral travel route that travels spirally in the field or other travel routes may be adopted.

(5) The above exemplary embodiment describes, the tractor equipped with the rotary tilling machine as the work device 30 is described as the work vehicle. However, in addition to the tractor, agricultural work vehicles such as a rice transplanter, a fertilizer distributor, and a combine may be adopted as the work vehicle.

According to the embodiment, a travel route generation device that generates a travel route for automatic traveling of a field work vehicle, includes: a field data inputting unit via which a field data is input, the field data including a shape and an entrance of a field; a travel route generation unit to generate the travel route covering the field; a getting-off point determination unit to determine a getting-off point at which a driver gets off the field work vehicle in the travel route; a getting-on determination unit to determine a getting-on point at which the driver gets on the field work vehicle in the travel route; and a travel route division unit to define a travel route for manual traveling as a travel route portion between the entrance and the getting-off point in the travel route and a travel route portion between the getting-on point and the entrance in the travel route and to define a travel route for the automatic traveling as a travel route portion between the getting-off point and the getting-on point in the travel route.

According to the configuration, in the travel route that is generated so as to cover the field in consideration of the entrance, the getting-off position at which the driver gets off the field work vehicle and the getting-on position at which the driver gets on the field work vehicle are properly determined, and the travel route for the manual operation and the travel route for the automatic operation are defined based on the getting-off position and the getting-on position. Therefore, the transition place between the manual operation and the automatic operation where the driver gets on and off the field work vehicle becomes a proper position, and the improper walk of the driver in the field is avoided.

In an advantageous exemplary embodiment of the present invention, based on an operation input by a user, the getting-off point determination unit is configured to determine the getting-off point, and the getting-on point determination unit is configured to determine the getting-on point. In the configuration, the driver gets on and off the field work vehicle at the desired position of the driver according to a characteristic of the field, a shape of the entrance, and specifications of the field work vehicle.

Preferably, in consideration of various conditions, the travel route for the manual operation and the travel route for the automatic operation are automatically divided at an optimum position, and the driver gets on and off the field work vehicle at that position. Therefore, it is avoided that the getting-off point and the getting-on point are determined at improper positions by carelessness of the driver. To this end, according to an advantageous exemplary embodiment of the present invention, based on a selected getting-off point condition and a selected getting-on point condition, the getting-off point determination unit is configured to automatically determine the getting-off point, and the getting-on point determination unit is configured to automatically determine the getting-on point. At this point, examples of the getting-on point condition and the getting-off point condition preferably include proximity to an extended line of a slope of the entrance, proximity to a ridge near the entrance, and a driver's exit of the field work vehicle facing to the ridge. By satisfying such conditions, the walk from the field work vehicle to the ridge and the walk from the ridge to the field work vehicle are proper for the driver and the field.

In an advantageous exemplary embodiment of the present invention, the travel route generation unit includes a round route determination unit, a reference straight line determination unit, an inside route determination unit, and an entry and exit route determination unit, the round route determination unit is configured to determine a round travel route for traveling around an outer peripheral area of the field, the reference straight line determination unit is configured to determine a reference straight line, which extends in parallel with a reference side of the field and fills a central area located inside the outer peripheral area at predetermined intervals, the inside route determination unit is configured to determine an inside travel route for traveling in the central area, the inside travel route including straight routes based on the reference straight line and a U-turn route connecting the straight routes, and the entry and exit route determination unit is configured to determine an entry route between the entrance and the inside travel route and an exit route between the entrance and the round travel route. According to the configuration, the inside travel route located inside the previously-determined round travel route is determined based on the reference straight line, and the traveling direction of the round travel route is determined based on the passing direction of the entrance such that the work vehicle passes smoothly through the entrance from the round travel route and goes out of the field. This avoids such the turning of the work vehicle due to a large steering angle in the vicinity of the entrance of the work vehicle that devastates the worked ground.

The travel route generation device of the present embodiment can be applied to the field work vehicle that works in the field along the set travel route.

Obviously, numerous modifications and variations of the present invention are possible in light of the above teachings. It is therefore to be understood that within the scope of the appended claims, the invention may be practiced otherwise than as specifically described herein.

What is claimed is:

1. A travel route generation device for a field work vehicle, comprising:
   a memory to store field data comprising:
      a shape of a field in which the field work vehicle is to work; and
      an entrance position of an entrance connected to the field such that the work vehicle is to enter and leave the field through the entrance; and
   circuitry configured to
      determine a getting-off point which is positioned in the field and at which the field work vehicle stops and a driver gets off the field work vehicle;
      determine a getting-on point which is positioned in the field and at which the field work vehicle stops and the driver gets on the field work vehicle;
      generate, based on the field data, a first partial route from the entrance position to the getting-off point such that the first partial route exists in the field, the circuitry providing for manual operation of the field work vehicle by the driver on the field work vehicle along the first partial route;

generate, based on the field data, a second partial route from the getting-on point to the entrance position such that the second partial route exists in the field, the circuitry providing for manual operation of the field work vehicle by the driver on the field work vehicle along the second partial route; and generate, based on the field data, a third partial route from the getting-off point to the getting-on point such that the third partial route exists in the field, the circuitry providing for automatic operation of the field work vehicle to automatically travel from the getting-off point along the third partial route to the getting-on point and stopping at the getting-on point.

2. The travel route generation device according to claim 1, wherein based on an operation input by a user, the circuitry is configured to determine the getting-off point and the getting-on point.

3. The travel route generation device according to claim 1, wherein based on a getting-off point condition and a getting-on point condition stored in the memory, the circuitry is configured to determine the getting-off point and the getting-on point.

4. The travel route generation device according to claim 3, wherein the getting-on point condition and the getting-off point condition include proximity to an extended line of a slope of the entrance, proximity to a ridge near the entrance, and a driver's exit of the field work vehicle facing to the ridge, the ridge surrounding the field and being higher than the field.

5. The travel route generation device according to claim 1, wherein the circuitry is configured to
determine a round travel route for traveling around a peripheral area of the field,
determine reference straight lines extending in parallel with a reference side of the field and arrayed at predetermined intervals to fill a central area located inside the peripheral area,
determine an inside travel route for traveling in the central area, the inside travel route including straight routes based on the reference straight lines and a U-turn route connecting the straight routes, and
determine an entry route between the entrance and the inside travel route and an exit route between the entrance and the round travel route.

6. A travel route generation device for a field work vehicle, comprising:
memory means for storing field data comprising:
a shape of a field in which the field work vehicle is to work; and
an entrance position of an entrance connected to the field such that the field work vehicle is to enter and leave the field through the entrance;
getting-off point determining means for determining a getting-off point which is positioned in the field and at which the field work vehicle stops and a driver gets off the field work vehicle;
getting-on point determining means for determining a getting-on point which is positioned in the field and at which the field work vehicle stops and the driver gets on the field work vehicle;
first partial route generating means for generating, based on the field data, a first partial route from the entrance position to the getting-off point such that the first partial route exists in the field, the first partial route being provided for manual operation of the field work vehicle by the driver on the field work vehicle along the first partial route;

second partial route generating means for generating, based on the field data, a second partial route from the getting-on point to the entrance position such that the second partial route exists in the field, the second partial route being provided for manual operation of the field work vehicle by the driver on the field work vehicle along the second partial route; and third partial route generating means for generating, based on the field data, a third partial route from the getting-off point to the getting-on point such that the third partial route exists in the field, the third partial route being provided for automatic operation of the field work vehicle to automatically travel from the getting-off point along the third partial route to the getting-on point and stopping at the getting-on point.

7. A method for generating a travel route for a field work vehicle, the method comprising:
reading field data comprising:
a shape of a field in which the field work vehicle is to work; and
an entrance position of an entrance connected to the field such that the field work vehicle is to enter and leave the field through the entrance;
determining a getting-off point which is positioned in the field and at which the field work vehicle stops and a driver gets off the field work vehicle;
determining a getting-on point which is positioned in the field and at which the field work vehicle stops and the driver gets on the field work vehicle;
generating, based on the field data, a first partial route from the entrance position to the getting-off point such that the first partial route exists in the field, the first partial route being provided for manual operation of the field work vehicle by the driver on the field work vehicle along the first partial route;
generating, based on the field data, a second partial route from the getting-on point to the entrance position such that the second partial route exists in the field, the second partial route being provided for manual operation of the field work vehicle by the driver on the field work vehicle along the second partial route; and
generate, based on the field data, a third partial route from the getting-off point to the getting-on point such that the third partial route exists in the field, the third partial route being provided for automatic operation of the field work vehicle to automatically travel from the getting-off point along the third partial route to the getting-on point and stopping at the getting-on point.

8. The travel route generation device according to claim 1, wherein the entrance position of the entrance connected to the field stored in the memory is provided such that the work vehicle is to enter and leave the field only through the entrance.

9. The travel route generation device according to claim 6, wherein the entrance position of the entrance connected to the field stored in the memory means is provided such that the work vehicle is to enter and leave the field only through the entrance.

10. The method according to claim 7, wherein the entrance position of the entrance connected to the field stored of the field data is provided such that the work vehicle is to enter and leave the field only through the entrance.

11. The travel route generation device according to claim 8,
wherein, based on a getting-off point condition and a getting-on point condition stored in the memory, the circuitry is configured to automatically determine the getting-off point and the getting-on point that are each positioned inside of an outer perimeter of the field, and
wherein the getting-on point condition and the getting-off point condition include proximity to an extended line of a slope of the entrance.

12. The travel route generation device according to claim 8,
wherein, based on a getting-off point condition and a getting-on point condition stored in the memory, the circuitry is configured to automatically determine the getting-off point and the getting-on point that are each positioned inside of an outer perimeter of the field, and
wherein the getting-on point condition and the getting-off point condition include proximity to a ridge near the entrance, the ridge surrounding the field and being higher than the field.

13. The travel route generation device according to claim 8,
wherein, based on a getting-off point condition and a getting-on point condition stored in the memory, the circuitry is configured to automatically determine the getting-off point and the getting-on point that are each positioned inside of an outer perimeter of the field, and
wherein the getting-on point condition and the getting-off point condition include a driver's exit of the field work vehicle facing toward a ridge near the entrance, the ridge surrounding the field and being higher than the field.

14. The travel route generation device according to claim 9,
wherein, based on a getting-off point condition stored in the memory means, the getting-off point determining means is configured to automatically determine the getting-off point that is positioned inside of an outer perimeter of the field,
wherein, based on a getting-on point condition stored in the memory means, the getting-on point determining means is configured to automatically determine the getting-on point that is positioned inside of the outer perimeter of the field, and
wherein the getting-on point condition and the getting-off point condition include proximity to an extended line of a slope of the entrance.

15. The travel route generation device according to claim 9,
wherein, based on a getting-off point condition stored in the memory means, the getting-off point determining means is configured to automatically determine the getting-off point that is positioned inside of an outer perimeter of the field,
wherein, based on a getting-on point condition stored in the memory means, the getting-on point determining means is configured to automatically determine the getting-on point that is positioned inside of the outer perimeter of the field, and
wherein the getting-on point condition and the getting-off point condition include proximity to a ridge near the entrance, the ridge surrounding the field and being higher than the field.

16. The travel route generation device according to claim 9,
wherein, based on a getting-off point condition stored in the memory means, the getting-off point determining means is configured to automatically determine the getting-off point that is positioned inside of an outer perimeter of the field,
wherein, based on a getting-on point condition stored in the memory means, the getting-on point determining means is configured to automatically determine the getting-on point that is positioned inside of the outer perimeter of the field, and
wherein the getting-on point condition and the getting-off point condition include a driver's exit of the field work vehicle facing toward a ridge near the entrance, the ridge surrounding the field and being higher than the field.

17. The method according to claim 10,
wherein the determining of the getting-off point is automatically determined based on a getting-off point condition stored in a memory, the getting-off point being positioned inside of an outer perimeter of the field,
wherein the determining of the getting-on point is automatically determined based on a getting-on point condition stored in a memory, the getting-on point being positioned inside of the outer perimeter of the field, and
wherein the getting-on point condition and the getting-off point condition include proximity to an extended line of a slope of the entrance.

18. The method according to claim 10,
wherein the determining of the getting-off point is automatically determined based on a getting-off point condition stored in a memory, the getting-off point being positioned inside of an outer perimeter of the field,
wherein the determining of the getting-on point is automatically determined based on a getting-on point condition stored in a memory, the getting-on point being positioned inside of the outer perimeter of the field, and
wherein the getting-on point condition and the getting-off point condition include proximity to a ridge near the entrance, the ridge surrounding the field and being higher than the field.

19. The method according to claim 10,
wherein the determining of the getting-off point is automatically determined based on a getting-off point condition stored in a memory, the getting-off point being positioned inside of an outer perimeter of the field,
wherein the determining of the getting-on point is automatically determined based on a getting-on point condition stored in a memory, the getting-on point being positioned inside of the outer perimeter of the field, and
wherein the getting-on point condition and the getting-off point condition include a driver's exit of the field work vehicle facing toward a ridge near the entrance, the ridge surrounding the field and being higher than the field.

* * * * *